US009062616B2

(12) United States Patent
Zhang et al.

(10) Patent No.: US 9,062,616 B2
(45) Date of Patent: Jun. 23, 2015

(54) SYSTEM AND METHOD FOR CONTROLLING TORQUE LOAD OF MULTIPLE ENGINES

(75) Inventors: Yanchai Zhang, Dunlap, IL (US); Evan Earl Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 13/586,220

(22) Filed: Aug. 15, 2012

(65) Prior Publication Data

US 2014/0052359 A1 Feb. 20, 2014

(51) Int. Cl.
*G05D 1/00* (2006.01)
*F02D 25/00* (2006.01)

(52) U.S. Cl.
CPC .................................... *F02D 25/00* (2013.01)

(58) Field of Classification Search
CPC ......... F02D 25/00; F02D 25/02; F02D 25/04; B60K 5/08; B60W 2050/0024
USPC ........................................................... 701/99
See application file for complete search history.

(56) References Cited

U.S. PATENT DOCUMENTS

| | | | | |
|---|---|---|---|---|
| 4,137,721 | A | 2/1979 | Glennon et al. | |
| 4,277,945 | A | 7/1981 | Esthimer et al. | |
| 5,771,860 | A * | 6/1998 | Bernardi | 123/352 |
| 6,474,068 | B1 * | 11/2002 | Abdel Jalil et al. | 60/716 |
| 6,862,511 | B1 * | 3/2005 | Phillips et al. | 701/54 |
| 6,945,344 | B2 * | 9/2005 | Stummer | 180/14.2 |
| 7,536,992 | B1 * | 5/2009 | Wieshuber et al. | 123/352 |
| 2003/0221880 | A1 * | 12/2003 | Stummer | 180/14.1 |
| 2005/0023058 | A1 * | 2/2005 | Gebby et al. | 180/69.6 |
| 2005/0060079 | A1 * | 3/2005 | Phillips et al. | 701/53 |
| 2006/0266256 | A1 * | 11/2006 | Donnelly et al. | 105/61 |
| 2008/0053402 | A1 * | 3/2008 | Hawkins et al. | 123/350 |
| 2009/0287382 | A1 * | 11/2009 | Blum et al. | 701/51 |

FOREIGN PATENT DOCUMENTS

| | | |
|---|---|---|
| EP | 2192292 | 2/2010 |
| JP | 57093665 | 6/1982 |
| JP | 3074531 | 3/1991 |
| JP | 2009127583 | 6/2009 |

* cited by examiner

*Primary Examiner* — John Q Nguyen
*Assistant Examiner* — Jordan S Fei
(74) *Attorney, Agent, or Firm* — BakerHostetler

(57) ABSTRACT

A method of controlling torque load of multiple engines according to a torque distribution algorithm includes determining a combined torque output value responsive to actual torque outputs of first and second engines. A desired torque output for the first engine is determined responsive to a first desired contribution portion of the combined torque output value, and a desired torque output for the second engine is determined responsive to a second desired contribution portion of the combined torque output value. A torque error for each of the first and second engines is determined responsive to a difference between the desired torque output for a respective one of the first and second engines and the actual torque output from the respective engine. Operation of each of the first and second engines is controlled responsive to the respective torque error.

20 Claims, 5 Drawing Sheets

SYSTEM AND METHOD FOR CONTROLLING TORQUE LOAD OF MULTIPLE ENGINES

TECHNICAL FIELD

The present disclosure relates generally to a system and method for controlling torque load of multiple engines, and more particularly to adjusting engine torque produced by each engine toward a desired contribution portion of a combined torque output of the multiple engines.

BACKGROUND

A tractor scraper is a type of earthmoving equipment used to perform a variety of operations, including loading, or capturing, material, such as soil, at one location and dumping, or depositing, the material at another location. For example, the scraper portion of the machine may include a bowl within which material may be captured, and a cutting edge located adjacent a cut opening of the bowl. Although various scraper configurations are available, scrapers are often pulled by a tractor, such as a wheeled or track type tractor having a first powertrain for propelling the machine. In addition, scrapers may provide their own traction via a second powertrain that applies rim pull, or power, to the wheels of the scraper. Such machines, including both tractor and scraper powertrains, may be referred to as dual powertrain machines.

During certain operating conditions, such as when the tractor powertrain is in top gear and at or near maximum speed, the scraper powertrain may be capable of pushing the tractor powertrain. To avoid this and other inefficient operating conditions of the tractor scraper, it may be desirable to balance the torque load of the engines of the two powertrains. Additional machines or applications using multiple engines to power a common load may also operate more efficiently where the torque load is balanced, or equally distributed, among the multiple engines of the system or machine. Land well service rigs are one of many additional examples of multiple engines providing a common source of power.

U.S. Pat. No. 4,137,721 to Glennon et al. (hereinafter Glennon) discusses a control system for two gas turbine engines of a helicopter power plant. In particular, the control system adjusts fueling to the gas turbine engines based on speed error signals and a torque feedback. The torque feedback generally includes a difference, if any, between the torque output of each of the engines. For each engine, the speed error and torque feedback are summed and input into proportional and integral control channels. Although Glennon may provide one strategy for controlling plural engines, the torque feedback aspect appears tightly integrated with the fueling control and, thus, may not be readily provided as a retrofit. Further, there is a continuing need for improved control strategies, including torque load control strategies, for multiple engine systems.

The present disclosure is directed to one or more of the problems or issues set forth above.

SUMMARY OF THE DISCLOSURE

In one aspect, a method of controlling torque load of multiple engines according to a torque distribution algorithm includes determining a combined torque output value responsive to actual torque outputs of first and second engines. A desired torque output for the first engine is determined responsive to a first desired contribution portion of the combined torque output value, and a desired torque output for the second engine is determined responsive to a second desired contribution portion of the combined torque output value. A torque error for each of the first and second engines is determined responsive to a difference between the desired torque output for a respective one of the first and second engines and the actual torque output from the respective engine. Operation of each of the first and second engines is controlled responsive to the respective torque error.

In another aspect, a multiple engine system includes a first engine and a second engine. A first proportional-integral controller is in communication with the first engine and is configured to receive as a first input a first torque error and provide as a first output a first engine speed adjustment value. The first torque error corresponds to a difference between a first desired torque output and a first actual torque output of the first engine, and the first desired torque output corresponds to a first desired contribution portion of a combined torque output of the first and second engines. A second proportional-integral controller is in communication with the second engine and is configured to receive as a second input a second torque error and provide as a second output a second engine speed adjustment value. The second torque error corresponds to a difference between a second desired torque output and a second actual torque output of the second engine, and the second desired torque output corresponds to a second desired contribution portion of the combined torque output.

In another aspect, a dual powertrain machine includes a first powertrain including a first transmission coupling a first engine and a first set of ground engaging elements, and a second powertrain including a second transmission coupling a second engine and a second set of ground engaging elements. An electronic controller is in communication with the first powertrain and the second powertrain and is configured to determine a combined torque output value responsive to a first actual torque output of the first engine and a second actual torque output of the second engine. The electronic controller is also configured to determine a first desired torque output for the first engine responsive to a first desired contribution portion of the combined torque output value, determine a second desired torque output for the second engine responsive to a second desired contribution portion of the combined torque output value, determine a first torque error for the first engine responsive to a difference between the first desired torque output and the first actual torque output, and determine a second torque error for the second engine responsive to a difference between the second desired torque output and the second actual torque output. A first engine speed of the first engine is adjusted responsive to the first torque error, while a second engine speed of the second engine is adjusted responsive to the second torque error.

DETAILED DESCRIPTION

Figure 1:
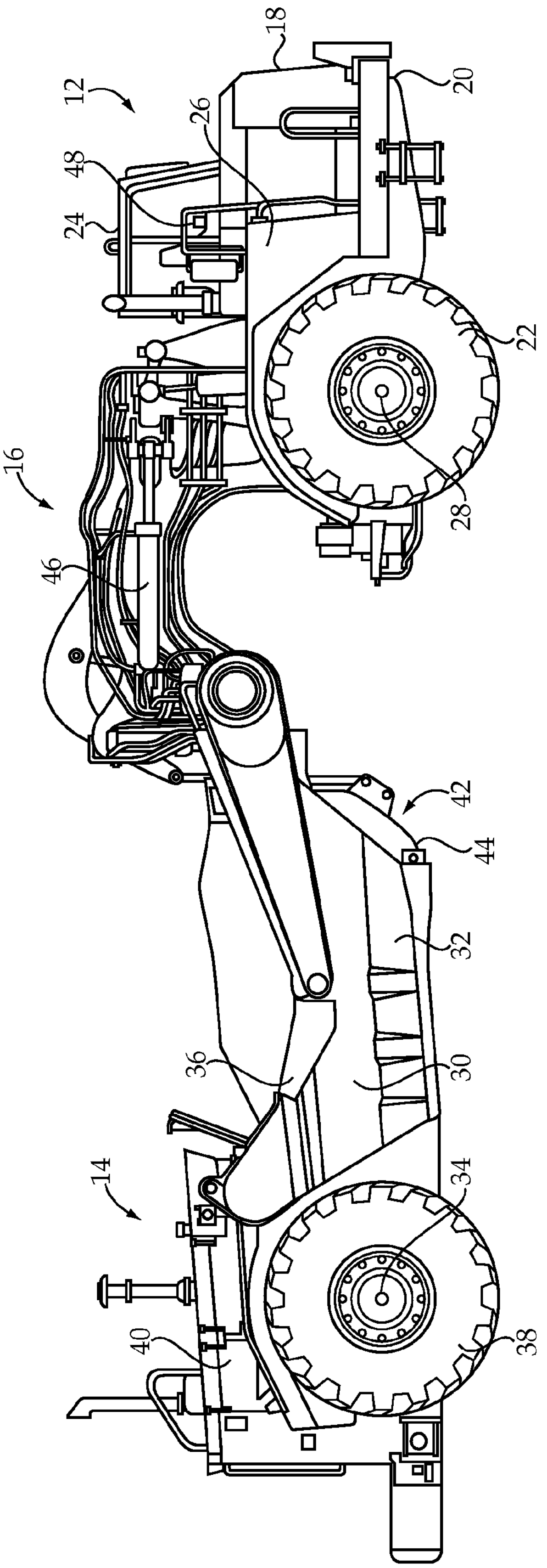
FIG. 1 is a side diagrammatic view of a dual powertrain machine, according to one embodiment of the present disclosure.

An exemplary embodiment of a machine 10 is shown generally in FIG. 1. The machine 10, shown as a tractor scraper, may be an articulated machine having a front portion 12 pivotably attached to a rear portion 14 at an articulated hitch 16. The front portion 12 may include a tractor 18 having a frame 20 supporting, among other systems and components, a first set of ground engaging elements 22, an operator control station 24, and a front engine compartment 26. The front engine compartment 26 may house portions of a first propulsion system, discussed below with reference to FIG. 2, which may provide propulsion means for driving the first set of ground engaging elements 22 through a front axle assembly 28.

The rear portion 14 may include a scraper 30 having a frame 32 supporting at least a rear axle assembly 34 about which a scraper bowl 36 may pivot. The frame 32 may also support a second set of ground engaging elements 38, which may be propelled by the rear axle assembly 34 using a second propulsion system housed within a rear engine compartment 40. The second propulsion system, discussed below in greater detail, may thus, according to such tandem powered arrangements, provide its own power, or traction, for the second set of ground engaging elements 38. The machine 10, having two propulsion systems, may also be referred to herein as a dual powertrain machine.

Although not within the scope of the present disclosure, those skilled in the art should appreciate that the scraper bowl 36 may define a cut opening 42, at a front portion of the scraper bowl 36, with a cutting edge, such as a scraper blade 44, positioned adjacent the cut opening 42. During an exemplary operation, the scraper bowl 36 may be pivoted downward about the axle assembly 34, such as by using one or more scraper bowl actuators or cylinders 46, to engage the scraper blade 44 with material, such as, for example, soil. Such material may be collected within the scraper bowl 36 as the tractor 18 and scraper 30 are maneuvered over the material. Although a simplified embodiment is described, it should be appreciated that scraper 30 may include additional components or features, such as, for example, an auger attachment, elevator mechanism, or ejector.

The operator control station 24, introduced above, may be supported on the front frame 20, and may include known devices, such as, for example, a seat assembly, steering device, and one or more operator displays that facilitate operator control of the tractor 18 and/or scraper 30. The operator control station 24 may include various other devices, including, but not limited to, one or more machine operation controllers. For example, a machine operation controller 48, such as a throttle, may be provided for selecting or controlling an engine speed of an internal combustion engine provided within either or both of engine compartments 26 and 40. Further, one or more machine operation controllers may be provided for controlling operation of the scraper 30, such as by controlling movement of the scraper bowl actuators or cylinders 46. Additional controls and devices, as should be appreciated, may also be provided within the operator control station 24 for controlling various operational aspects of the tractor 18 and/or scraper 30 using mechanical, hydraulic, and/or electronic control means.

Figure 2:
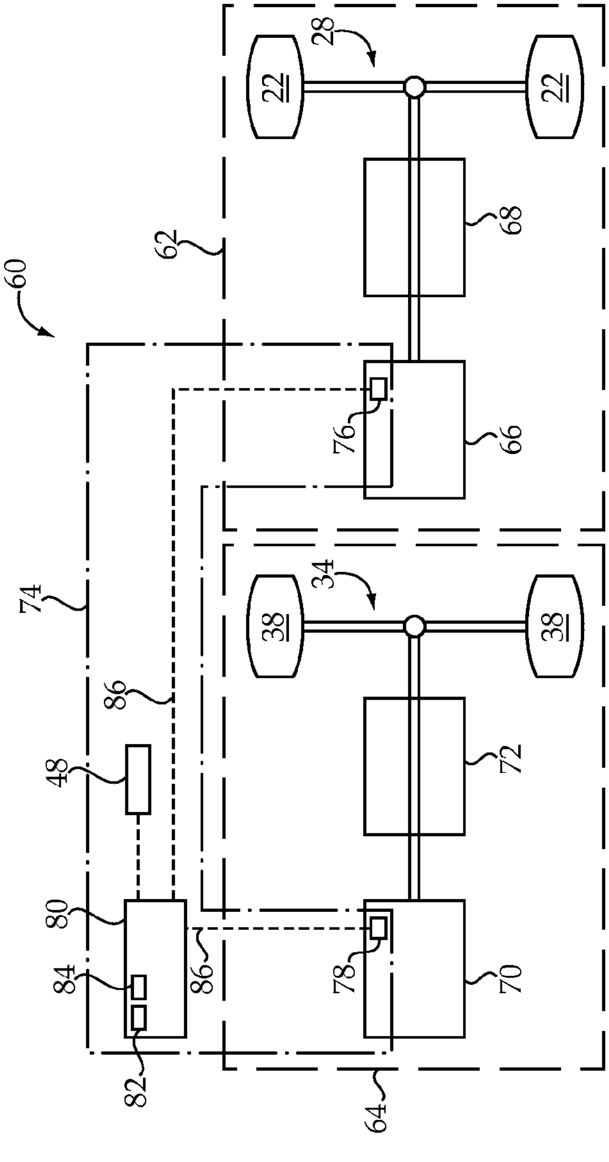
FIG. 2 is a block diagram of a multiple engine system, including first and second powertrains, of the dual powertrain machine of FIG. 1.

Turning now to FIG. 2, a multiple engine system, or dual powertrain system, for the machine 10 is shown generally at 60. The multiple engine system 60 may include a first electronically controlled powertrain 62, also referred to as a front or primary powertrain, and a second electronically controlled powertrain 64, also referred to as a rear or secondary powertrain. The first powertrain 62 may include a first electronically controlled engine 66 housed within the front engine compartment 26 and coupled to the ground engaging elements 22 via a first electronically controlled transmission 68. The second powertrain 64 may be similar to the first powertrain 62 and may include a second electronically controlled engine 70 housed within the rear engine compartment 40 and coupled to the ground engaging elements 38 via a second electronically controlled transmission 72. Although simplified versions of the first and second powertrains 62 and 64 are shown, it should be appreciated that each of the first and second powertrains 62 and 64 may include additional and/or alternative components without deviating from the scope of the present disclosure.

The multiple engine system 10 may also include a control system 74 including one or more electronic controllers. For example, the first powertrain 62 may include at least a first engine controller 76, while the second powertrain 64 may similarly include at least a second engine controller 78. The control system 74 may include more or less electronic controllers, as necessary, to provide desired electronic control of engine and/or powertrain operations. Further, a main electronic controller 80 may be provided, or one of the electronic controllers 76 and 78 may be designated the main controller, to coordinate functions and/or facilitate communication within the control system 74. It should be appreciated that the particular control system 74 presented herein is provided for exemplary purposes only.

Each of the electronic controllers 76, 78, and 80 may be of standard design and may include a processor, such as, for example, a central processing unit, a memory, and an input/output circuit that facilitates communication internal and external to the electronic controllers 76, 78, and 80. The processor, for example, may control operation of each of the electronic controllers 76, 78, and 80 by executing operating instructions, such as, for example, computer readable program code stored in the memory, wherein operations may be initiated internally or externally to the electronic controllers 76, 78, and 80. Control schemes may be utilized that monitor outputs of systems or devices, such as, for example, sensors, actuators, or control units, via the input/output circuit to control inputs to various other systems or devices. For example, the main electronic controller 80 may be in communication with, and may utilize input from, the throttle 48 to control speed of the engines 66 and 70.

The memory, as used herein, may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. One skilled in the art will appreciate that any computer based system or device utilizing similar components for controlling the machine systems or components described herein, is suitable for use with the present disclosure.

According to the exemplary embodiment, the main electronic controller 80 may include a processor 82 and a memory 84, both having capabilities similar to those described above. The processor 82 may access program code stored in memory 84 to perform and/or coordinate machine and, more specifically, engine operations. While engine electronic controllers 76 and 78 may directly control operation of the respective engines 66 and 70, the main electronic controller 80 may control or coordinate operations of the machine 10, including facilitating communication, such as using communication lines 86 of a Controller Area Network (CAN), among sensors, controllers, and displays of the machine 10 and/or multiple engine system 60. As such, the main electronic controller 80 may coordinate control of the two powertrains 62 and 64, including first and second engines 66 and 70. Alternatively, or additionally, the engine electronic controllers 76 and 78 may communicate directly with one another.

Figure 3:
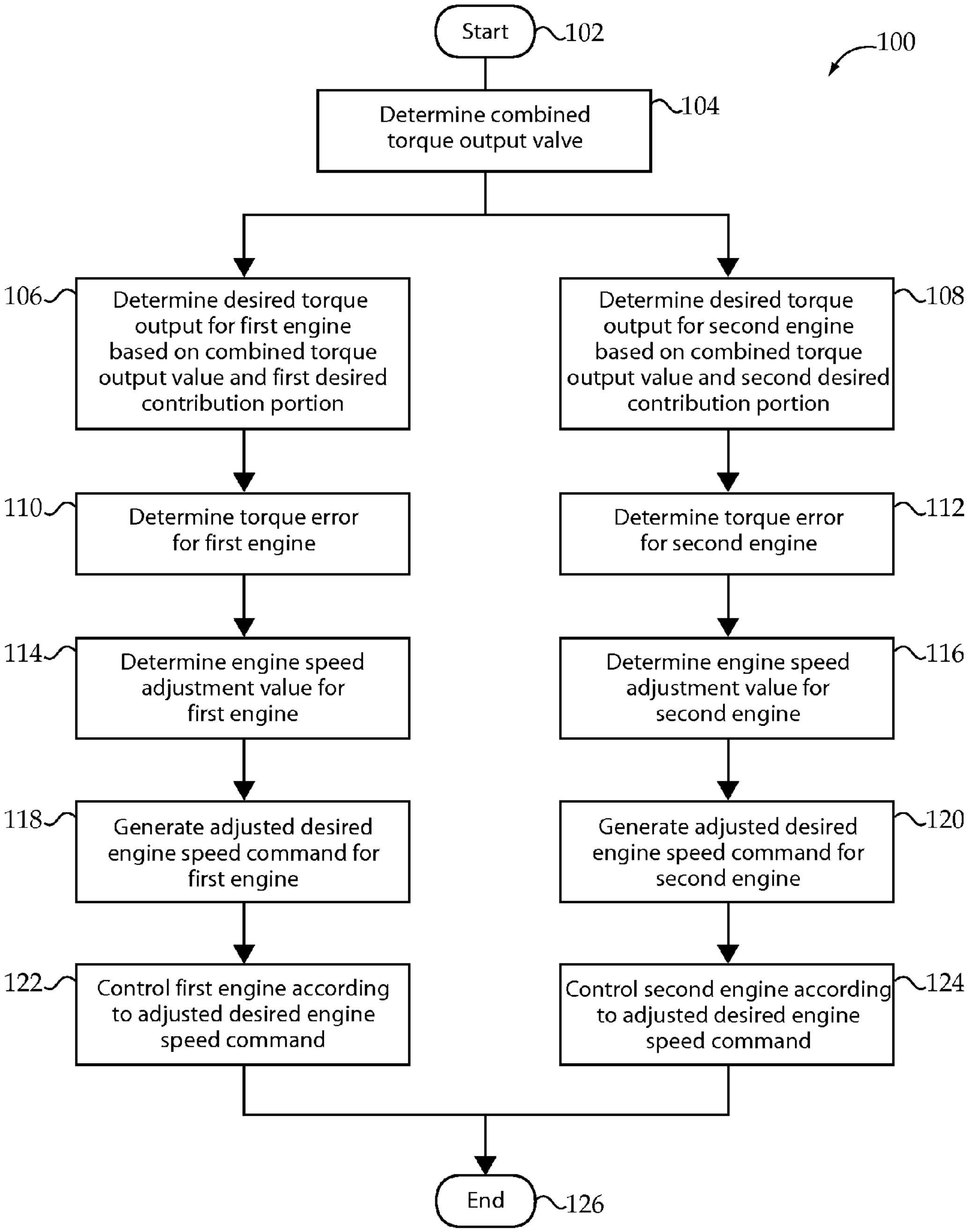
FIG. 3 is a flow chart of one embodiment of a method of controlling torque load of the multiple engine system of FIG. 2, according to one aspect of the present disclosure.

Turning now to FIG. 3, there is shown a logic flow diagram 100 representing an exemplary method for controlling torque load of the multiple engine system 60, or an alternative system including multiple engines powering a common load. The method may be implemented by any one or more of the electronic controllers 76, 78, and 80, or alternative electronic controllers, as will be described herein. According to a specific example, the steps implementing the disclosed method may be in the form of computer readable program code stored in the memory 84 of the main electronic controller 80 and executed by the processor 82 of the main electronic controller 80, or other computer usable medium. However, alternative implementations of the method are also contemplated. The method may run continuously or may be initiated in response to one or more predetermined events.

The method begins at a START, Box 102. From Box 102, the method proceeds to Box 104, which includes the step of determining a combined torque output value. The combined torque output value may represent the total torque output of the multiple engine system 60, including torque produced by both of the first engine 66 and the second engine 70. The torque may be measured using torque sensors or may be calculated as an estimated torque output based on engine calculations or may be based on a reported fuel rate. Those skilled in the art will appreciate that various means exist for arriving at actual torque output values for each of the engines 66 and 70. After calculating the combined torque output value of the multiple engine system 60, the method proceeds to Boxes 106 and 108.

At Box 106, a first desired torque output for the first engine 66 is determined based on a first desired contribution portion of the combined torque output value calculated at Box 104. For example, if it is desirable to balance, or equally distribute, torque load among the engines 66 and 70 of the multiple engine system 60, the first desired contribution portion may be set accordingly. In particular, since the multiple engine system 60 includes two engines 66 and 70 it may be desirable to set the first desired contribution portion to 50%. Similarly, a second desired torque output of the second engine 70 may be determined, at Box 108, based on a second desired contribution portion of the combined torque output value. Although the second desired contribution portion may also be set to 50%, it should be appreciated that the desired contribution portions may vary, depending on the particular application. Thus, the first and second desired contribution portions may be set to equal values, as described, or unequal values.

First and second torque errors are then calculated at respective Boxes 110 and 112. The first torque error may include a difference between the first desired torque output of the first engine 66 and the actual torque output of the first engine 66, both of which are described above. The second torque error may include a difference between the second desired torque output of the second engine 70 and the actual torque output of the second engine 70. Each of the torque error values may then be used to determine engine speed adjustment values for each of the engines 66 and 70. In particular, at Box 114, a first engine speed adjustment value may be calculated for the first engine 66 in response to the first torque error of the first engine 66. Similarly, at Box 116, a second engine speed adjustment value may be calculated for the second engine 70 in response to the second torque error of the second engine 70. Since it is likely that the actual torque outputs of the engines 66 and 70 will be at least slightly different, it should be appreciated that the resulting torque errors and, thus, the calculated engine speed adjustment values will also be different. Such calculations may be performed using one or more feedback loops, as will be discussed below.

The first and second engine speed adjustment values are then used to control operation of the first and second engines 66 and 70. In particular, at Box 118, a first adjusted desired engine speed command may be generated for the first engine 66. The first adjusted desired engine speed command may represent an adjustment of a desired engine speed value according to the first engine speed adjustment value. At Box 120, a second adjusted desired engine speed command may be generated for the second engine 70, and may represent an adjustment of the desired engine speed value according to the second engine speed adjustment value. According to the exemplary embodiment, the desired engine speed value may be set responsive to a position of the operator throttle 48, with the desired engine speed value being the same for both engines 66 and 70.

The first and second engines 66 and 70 are then controlled using the respective adjusted desired engine speed commands, as shown at Boxes 122 and 124. In particular, for example, the engine speed of the first engine 66 may be maintained below a target speed, as indicated by the first adjusted desired engine speed command, using an electronically controlled engine governor. The engine speed of the second engine 70 may also be maintained below a target speed, as indicated by the second adjusted desired engine speed command. The method then proceeds to an end at Box 126. As stated above, the method may run continuously to adjust the speed of the engines 66 and 70 and, thus, control, or balance, the torque produced.

Figure 4:
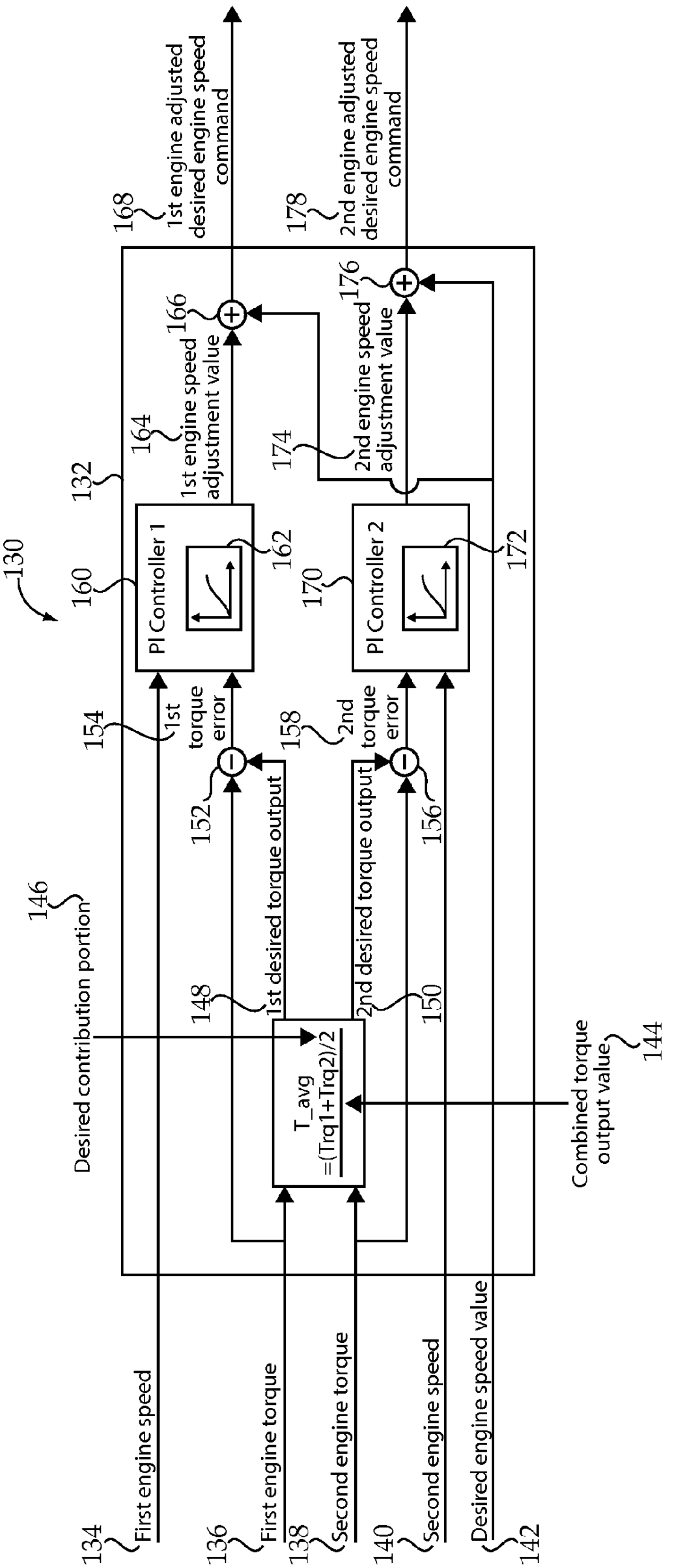
FIG. 4 is a diagrammatic illustration of an exemplary implementation of a torque distribution algorithm corresponding to the method of FIG. 3.

Turning now to FIG. 4, a particular implementation of the method described above will be discussed. In particular, a torque distribution algorithm 130 may be executed on an electronic controller 132, which may correspond to one or more of the electronic controllers 76, 78, and 80. The controller 132 may receive as inputs a first engine speed 134, a first engine torque 136, a second engine torque 138, a second engine speed 140, and a desired engine speed value 142. The engine speeds 134 and 140 and the engine torques 136 and 138 may each be sensed or calculated using known means, while the desired engine speed value 142 may be determined based on an operator input, such as the throttle 48.

The first and second engine torques 136 and 138 may be combined, or added, to arrive at a combined torque output value 144. The combined torque output value 144, thus, represents the total torque produced by the multiple engine system 60. A desired contribution portion, such as desired contribution portion 146, may be used to distribute the combined torque output value 144 among the engines 66 and 70 of the multiple engine system 60. According to the exemplary embodiment, it may be desirable to balance, or equally distribute, the torque load of the engines 66 and 70. As such, the combined torque output value 144 may be divided in half, as shown, to ascertain a first desired torque output 148 for the first engine 66 and a second desired torque output 150 for the second engine 70. Although the desired contribution portion 146 is the same for both engines 66 and 70, according to the exemplary embodiment, it should be appreciated that alternative embodiments may require desired contribution portions 146 that are different for each of the engines 66 and 70.

It should also be appreciated that alternative embodiments may require a distribution of torque among more engines than just first and second engines 66 and 70.

A difference between the first desired torque output 148 and the first engine torque 136 is determined, at a summation block 152, to arrive at a first torque error 154. Similarly, a difference between the second desired torque output 150 and the second engine torque 138 is determined, at a summation block 156, to arrive at a second torque error 158. The first torque error 154, along with the first engine speed 134, may be fed into a first proportional-integral (PI) controller 160, or other similar controller, as shown. The first PI controller 160 may reference a first gain scheduling map 162, an example of which will be discussed below, to select a gain corresponding to the first engine speed 134 to be used by the controller 132. The PI controller 160 may operate in a known fashion to ultimately adjust an engine speed of the first engine 66 according to the selected gain based on the first torque error 154. As such, the PI controller 160 may output a first engine speed adjustment value 164, which is combined with the desired engine speed value 142 at a summation block 166, to generate a first engine adjusted desired engine speed command 168. The first engine adjusted desired engine speed command 168 is then used to control the first engine 66 in a known manner.

The second torque error 158, along with the second engine speed 140, may be fed into a second PI controller 170. The second PI controller 170 may reference a second gain scheduling map 172, which may be the same as the first gain scheduling map 162, to select a gain corresponding to the second engine speed 140 to be used by the controller 170. The PI controller 170 may adjust an engine speed of the second engine 70 according to the selected gain based on the second torque error 158. As a result, the PI controller 170 may output a second engine speed adjustment value 174, which is combined with the desired engine speed value 142 at a summation block 176, to generate a second engine adjusted desired engine speed command 178. The second engine adjusted desired engine speed command 178 is then used to control the second engine 70 in a known manner.

Figure 5:
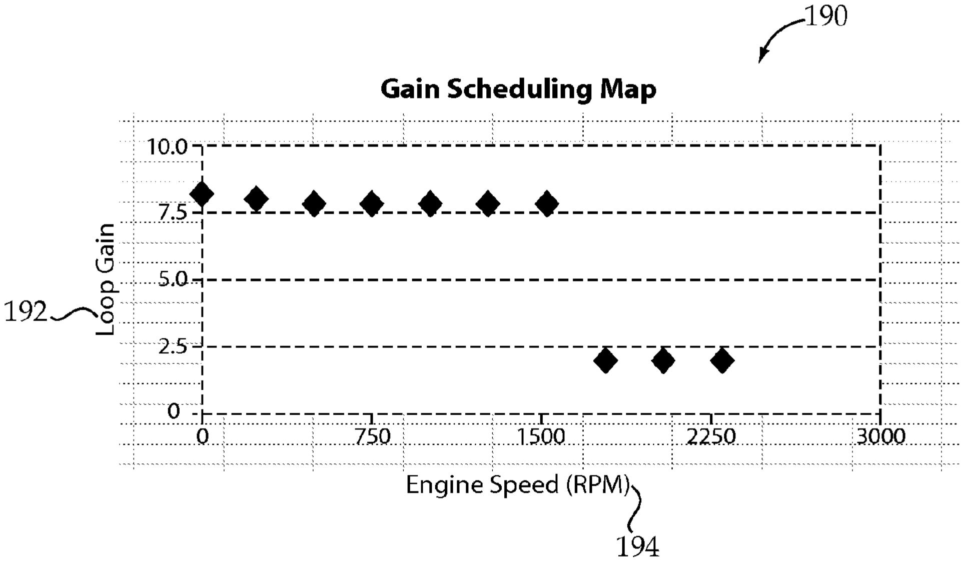
FIG. 5 is an exemplary gain scheduling map relating gain values to engine speed values, according to another aspect of the present disclosure.

Turning now to FIG. 5, an exemplary gain scheduling map 190 relating gain values 192 to engine speed values 194 is shown. As shown, the gain values 192 may decrease as the engine speed values 194 increase. However, according to alternative embodiments, the gain values 192 may increase as the engine speed values 194 increase. It should be appreciated that the gain values 192 provided in the gain scheduling map 190 are provided for exemplary purposes only. The gain values 192 are configurable and may be arrived at through testing in order to provide desired operation of the multiple engine system 60. For example, according to some embodiments, improved stability at higher speeds may be achieved by utilizing gain values 192 that decrease as engine speed values 194 increase. Further, improved operation may result from using gain values 192 that are selected based on both current engine speed and desired torque.

INDUSTRIAL APPLICABILITY

The present disclosure may be applicable to multiple engine systems, which may include machines and/or systems utilizing multiple engines to power a common load. For example, the present disclosure may be applicable to a dual powertrain machine including a first powertrain for driving a first set of ground engaging elements and a second powertrain for driving a second set of ground engaging elements. Further, the present disclosure may be applicable to strategies for controlling the torque load of the engines within the multiple engine system.

Referring generally to FIGS. 1-5, a dual powertrain machine 10 may be an articulated machine having a front portion 12, or tractor 18, pivotably attached to a rear portion 14, or scraper 30, at an articulated hitch 16. The dual powertrain machine 10 represents one embodiment of a multiple engine system 60, as described herein. In particular, the tractor 18 may include a first electronically controlled powertrain 62 for driving a first set of ground engaging elements 22, while the scraper 30 may include a second electronically controlled powertrain 64 for driving a second set of ground engaging elements 38. The first, or primary, powertrain 62 may include a first electronically controlled engine 66 coupled to the ground engaging elements 22 via a first electronically controlled transmission 68, while the second powertrain 64 may include a second electronically controlled engine 70 coupled to the ground engaging elements 38 via a second electronically controlled transmission 72.

The dual powertrain machine 10 may be propelled by transmitting power from the first engine 66 to the first set of ground engaging elements 22, and transmitting power from the second engine 70 to the second set of ground engaging elements 38. During certain or all operations, it may be desirable to control the torque loads of the engines 66 and 70. In particular, it may be desirable to balance, or equally distribute, the torque load among the engines 66 and 70. To accomplish such torque load control, the torque distribution algorithm 130 disclosed herein may be utilized. In particular, an electronic controller 132, which may correspond to one or more of the electronic controllers 76, 78, and 80, may receive as inputs a first engine speed 134, a first engine torque 136, a second engine torque 138, a second engine speed 140, and a desired engine speed value 142.

The first and second engine torques 136 and 138 may be combined to arrive at a combined torque output value 144. A desired torque output 148 for the first engine 66 is determined based on a desired contribution portion, such as contribution portion 146, of the combined torque output value 144. Similarly, a desired torque output 150 for the second engine 70 is determined based on a desired contribution portion, such as contribution portion 146, of the combined torque output value 144. According to the exemplary embodiment, it may be desirable to equally distribute the torque load among the engines 66 and 70 and, thus, the desired contribution portion 146 for each of the engines 66 and 70 may be equal halves of the combined torque output value 144. A difference between the first desired torque output 148 and the first engine torque 136 is determined to arrive at a first torque error 154, and a difference between the second desired torque output 150 and the second engine torque 138 is determined to arrive at a second torque error 158.

The first torque error 154, along with the first engine speed 134, is fed into a first PI controller 160. The first PI controller 160 may adjust an engine speed of the first engine 66, according to a gain selected from a gain scheduling map 162, based on the first torque error 154. As a result, the PI controller 160 may output a first engine speed adjustment value 164, which is combined with the desired engine speed value 142, to generate a first engine adjusted desired engine speed command 168. Similarly, the second torque error 158, along with the second engine speed 140, is fed into a second PI controller 170. The second PI controller 170 may adjust an engine speed of the second engine 70, according to a gain selected from a gain scheduling map 172, based on the second torque error 158. As a result, the PI controller 170 outputs a second engine speed adjustment value 174, which is combined with the desired engine speed value 142 at Box 176, to generate a second engine adjusted desired engine speed command 178. The first and second engine adjusted desired engine speed commands 168 and 178 are then used to control the respective engine 66 or 70.

The disclosed system and method for controlling torque load of multiple engines includes an effective control strategy that may be provided on new machines or engine systems or may be provided as a retrofit. In particular, the disclosed control strategy may be embodied on one or more controllers that may reside electronically between the operator controls and the engines. The one or more controllers are configured, as described herein, to adjust engine torque produced by each of the engines of the multiple engine system toward a desired contribution portion of the total torque output of the multiple engines to effectively balance, or otherwise distribute, the total torque load.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of controlling torque load in a machine having a front portion pivotally connected to a rear portion, the front portion and the rear portion each including an engine and a powertrain, comprising:

executing a torque distribution algorithm on an electronic controller, including:

determining a combined torque output value responsive to a first actual torque output of a first engine associated with a dual powertrain machine;

determining a second actual torque output of a second engine associated with the dual powertrain machine, wherein the dual powertrain machine includes separately operating electronically controlled transmissions;

determining a first desired torque output for the first engine responsive to a first desired contribution portion of the combined torque output value;

determining a second desired torque output for the second engine responsive to a second desired contribution portion of the combined torque output value;

determining a first torque error for the first engine responsive to a difference between the first desired torque output and the first actual torque output;

determining a second torque error for the second engine responsive to a difference between the second desired torque output and the second actual torque output;

controlling operation of the first engine responsive to the first torque error; and controlling operation of the second engine responsive to the second torque error.

2. The method of claim 1, further including:

determining a first engine speed adjustment value for the first engine responsive to the first torque error;

determining a second engine speed adjustment value for the second engine responsive to the second torque error;

generating a first adjusted desired engine speed command for the first engine responsive to a desired engine speed value and the first engine speed adjustment value;

generating a second adjusted desired engine speed command for the second engine responsive to the desired engine speed value and the second engine speed adjustment value;

controlling operation of the first engine responsive to the first adjusted desired engine speed command; and controlling operation of the second engine responsive to the second adjusted desired engine speed command.

3. The method of claim 2, further including setting the desired engine speed value responsive to an operator throttle position.

4. The method of claim 2, further including:

determining the first engine speed adjustment value using a first proportional-integral controller; and determining the second engine speed adjustment value using a second proportional-integral controller.

5. The method of claim 4, further including:

setting a first gain for the first proportional-integral controller based on a first current engine speed of the first engine; and setting a second gain for the second proportional-integral controller based on a second current engine speed of the second engine.

6. The method of claim 1, further including setting the first desired contribution portion and the second desired contribution portion to equal values.

7. The method of claim 1, further including assigning unequal values to the first torque error and the second torque error.

8. The method of claim 1, further including:

providing power to a front powertrain of a dual powertrain machine with the first engine; and providing power to a rear powertrain of the dual powertrain machine with the second engine.

9. A multiple engine system in a machine having a front portion pivotally connected to a rear portion, the front portion and the rear portion each including an engine and a powertrain, the system comprising:

a first engine associated with a dual powertrain machine;

a second engine associated with the duel powertrain machine, wherein the duel powertrain machine includes separately operating electronically controlled transmissions;

a first proportional-integral controller in communication with the first engine and configured to receive as a first input a first torque error and provide as a first output a first engine speed adjustment value, wherein the first torque error corresponds to a difference between a first desired torque output and a first actual torque output of the first engine, wherein the first desired torque output corresponds to a first desired contribution portion of a combined torque output of the first and second engines; and a second proportional-integral controller in communication with the second engine and configured to receive as a second input a second torque error and provide as a second output a second engine speed adjustment value, wherein the second torque error corresponds to a difference between a second desired torque output and a second actual torque output of the second engine, wherein the second desired torque output corresponds to a second desired contribution portion of the combined torque output.

10. The multiple engine system of claim 9, wherein the first proportional-integral controller is further configured to generate a first adjusted desired engine speed command for the first engine responsive to a desired engine speed value and the first engine speed adjustment value, and the second proportional-integral controller is further configured to generate a second adjusted desired engine speed command for the second engine responsive to the desired engine speed value and the second engine speed adjustment value.

11. The multiple engine system of claim 10, wherein a first engine speed of the first engine is controlled with the first adjusted desired engine speed command, and a second engine speed of the second engine is controlled with the second adjusted desired engine speed command.

12. The multiple engine system of claim 10, further including an operator throttle, wherein the desired engine speed value corresponds to a position of the operator throttle.

13. The multiple engine system of claim 9, wherein a first gain for the first proportional-integral controller is based on a first current engine speed of the first engine, and a second gain for the second proportional-integral controller is based on a second current engine speed of the second engine.

14. The multiple engine system of claim 13, wherein the first gain and the second gain are selected from at least one electronically stored gain scheduling map having gain values mapped to engine speed values, wherein the gain values decrease as the engine speed values increase.

15. The multiple engine system of claim 9, wherein the first desired contribution portion and the second desired contribution portion are equal.

16. The multiple engine system of claim 9, wherein the first torque error and the second torque error are unequal.

17. The multiple engine system of claim 9, wherein the first engine corresponds to a front powertrain of a dual powertrain machine, and the second engine corresponds to a rear powertrain of the dual powertrain machine.

18. A dual powertrain machine having a front portion pivotally connected to a rear portion, the front portion and the rear portion each including an engine and a powertrain, the machine comprising:

a first powertrain including a first transmission coupling a first engine and a first set of ground engaging elements;

a second powertrain including a second transmission coupling a second engine and a second set of ground engaging elements; and an electronic controller in communication with the first powertrain and the second powertrain, wherein the electronic controller is configured to:

determine a combined torque output value responsive to a first actual torque output of the first engine and a second actual torque output of the second engine;

determine a first desired torque output for the first engine responsive to a first desired contribution portion of the combined torque output value;

determine a second desired torque output for the second engine responsive to a second desired contribution portion of the combined torque output value;

determine a first torque error for the first engine responsive to a difference between the first desired torque output and the first actual torque output;

determine a second torque error for the second engine responsive to a difference between the second desired torque output and the second actual torque output;

adjust a first engine speed of the first engine responsive to the first torque error; and adjust a second engine speed of the second engine responsive to the second torque error.

19. The dual powertrain machine of claim 18, wherein the first desired contribution portion and the second desired contribution portion are equal.

20. The dual powertrain machine of claim 18, wherein the first torque error and the second torque error are unequal.

* * * * *